United States Patent [19]

Bossaert

[11] Patent Number: 5,213,744

[45] Date of Patent: May 25, 1993

[54] PROCESS FOR MAKING POLYOLEFIN FILMS

[75] Inventor: Bernard L. L. Bossaert, Brussels, Belgium

[73] Assignee: Exxon Chemical Patents Inc., Linden, N.J.

[21] Appl. No.: 914,223

[22] Filed: Jul. 13, 1992

Related U.S. Application Data

[63] Continuation of Ser. No. 618,018, Nov. 26, 1990, abandoned, which is a continuation of Ser. No. 183,820, Apr. 20, 1988, abandoned.

[30] Foreign Application Priority Data

Apr. 21, 1988 [GB] United Kingdom .............. 87-09446

[51] Int. Cl.$^5$ ...................... B29C 47/06; B29C 47/60; B32B 31/30
[52] U.S. Cl. ............................... 264/171; 264/211.23; 264/288.4; 264/290.2; 523/351; 524/274; 525/210
[58] Field of Search ............... 264/171, 211.23, 288.4, 264/290.2, 349; 427/209, 393.5; 523/351; 524/270, 274; 525/210, 241, 327.9

[56] References Cited

U.S. PATENT DOCUMENTS

| | | | |
|---|---|---|---|
| 3,361,849 | 1/1968 | Cramer et al. | 525/210 |
| 3,666,836 | 5/1972 | John | 525/210 |
| 4,343,852 | 8/1982 | Isaka et al. | 428/516 X |

FOREIGN PATENT DOCUMENTS

| | | | |
|---|---|---|---|
| 82726 | 6/1983 | European Pat. Off. | |
| 57-57769 | 4/1982 | Japan | 524/274 |
| 1231861 | 5/1971 | United Kingdom | |
| 1245250 | 9/1971 | United Kingdom | |
| 1318137 | 5/1973 | United Kingdom | |
| 1516420 | 7/1978 | United Kingdom | |

*Primary Examiner*—Leo B. Tentoni
*Attorney, Agent, or Firm*—T. Dean Simmons; Robert W. Mulcahy

[57] ABSTRACT

Polyolefin films for heat sealed packaging and twist wrapping are obtained by blending under high shear conditions and a rosin or resin, preferably hydrogenated to form a concentrate containing from 10 to 90 wt. %, preferably 20 to 60 wt. % of the resin or rosin and subsequently blending the concentrate with a and extruding the resultant blend to form a film.

14 Claims, No Drawings

PROCESS FOR MAKING POLYOLEFIN FILMS

This is a continuation of application Ser. No. 07/618,018, filed Nov. 26, 1990, now abandoned, which is a continuation of application Ser. No. 183,820, filed Apr. 20, 1988, now abandoned, which was based upon UK Patent No. 8,709,446 filed Apr. 21, 1987.

FIELD OF THE INVENTION

This invention relates to compositions for the production of films based on polyolefins especially polypropylene in particular those films suitable for twist wrapping applications and those which have improved stiffness, clarity, heat sealability and/or barrier properties.

BACKGROUND OF THE INVENTION

There have been many proposals for the addition of rosins and resins to polyolefin films to improve stiffness, clarity and heat sealability. For example U.S. Pat. No. 3,361,849 suggests the inclusion of rosins and their hydrogenated derivatives. U.S. Pat. No. 3,666,836 and United Kingdon Patent 1 318 137 suggest the inclusion of hydrogenated petroleum resin derivatives and United Kingdon Patent 1231861 suggests that such materials may be useful in twist wrapping.

While in some applications these products have been acceptable they have not proved successful in twist wrapping and this is believed to be due to the difficulties in incorporating relatively large amounts of the resin or rosin derivatives in the polyolefin. As is recognized in United Kingdom Patent 1245250 melt blending is difficult due primarily to the difference in softening/melting temperatures of the polyolefin and the resin or rosin and the difference in their rheological properties in the melt. The process of U.K. Patent 1245250 is both complex and not suited to the production of oriented films.

SUMMARY OF THE INVENTION

We have now found that satisfactory blends containing relatively large amounts of resin may be obtained by mixing the molten polyolefin and softened resin under high shear conditions. These conditions that should be used are not, however, those suitable for the extrusion of polyolefins in the production of films.

The present invention therefore provides a process for the production of oriented polyolefin films comprising blending under high shear conditions a polyolefin and a rosin or resin, preferably hydrogenated to form a concentrate containing from 10 to 90 wt. % of the resin or rosin and subsequently blending the concentrate with a polyolefin and extruding the resultant blend to form a film.

DETAILED DESCRIPTION OF THE INVENTION

These films are capable of being used in the packaging industry and can meet the stringent criteria which are required for such films, such as sufficiently high modulus, excellent clarity and superior seal strength properties. The films containing large amounts of resin are especially useful for twist wrapping applications. The polyolefin from which the film is made is preferably a polymer of a mono-alpha olefin containing from 2 to 8 carbon atoms particularly 2 to 4 carbon atoms per molecule. Thus the polymer may be a homopolymer of one, or a copolymer of two or more of the following olefins, ethylene, propylene, butene-1, hexene and 4-methyl pentene-1. A particularly suitable material for the base layer of the film is polypropylene, especially a high molecular weight stereoregular predominantly crystalline polymer of propylene. Alternatively, a copolymer of propylene with up to 20 weight percent of another olefin, e.g. ethylene, could be used. An especially preferred polyolefin is an isotactic polypropylene with a density of from 0.86 to 0.92 g/cc and a melt flow index of from 1 to 15 g/10 min as determined according to ASTM D1238 (conditions 230° C. and 2.16 kg). It may be made by Ziegler polymerization methods using for example $AlCl_3$ and $TiCl_4$ as catalysts.

The polyolefin used to make the concentrate may be one of those mentioned above as suitable for film manufacture but need not be the same as the polyolefin used to make the film. We prefer to use polypropylene homopolymer for the manufacture of the concentrate.

The other component in the concentrate is the low molecular weight resin or rosin, preferably a hydrogenated resin. This resin has a number average molecular weight as measured by vapour phase osmometry below that of the polyolefin and is usually less than 5000, preferably less than 1000, for example, 500 to 1000. The resin can be a natural or synthetic resin and can have a Ring and Ball softening point of from 60° to 180° C., e.g. from 80° to 160° C., preferably 130° to 150° C.

Examples of other suitable resin and rosins are the liquid and amorphous semi-solid petroleum hydrocarbons, asphalt, hydrocarbon resins such as the polyterpene resins, coal and petroleum resins, rosins, rosin derivatives, and styrene resins.

All of the above are substantially amorphous materials which can be added to a polyolefin to achieve benefits such as stiffening action, increased modulus, increased strength in films made from the polyolefin as well as modification of flow characteristics.

The polyterpene resins are a well-known class of resinous materials obtained by the polymerization or copolymerization of terpene hydrocarbons such as the alicyclic, mono-cyclic and bicyclic terpenes, and their mixtures, including carene, isomerised pinene, dipentene, terpinene, terpinolene, turpentine, a terpene cut or fraction, and various other terpenes. Typical of such terpene resins are those sold under the trademark "PICCOLYTE", which are beta-pinene polymers and which exist in a wide range of softening points of from 10° C. to 135° C. They generally have densities of from 0.97 to 1.0 and range in molecular weight up to about 1200.

The hydrogenated polyterpenes are also effective for improving the properties of films. These are produced by hydrogenating the polyterpenes by any of the usual hydrogenation processes. Generally the hydrogenation is carried out utilizing a catalyst such as nickel, nickel on kieselguhr, copper chromite, palladium-on alumina, or cobalt plus zirconia or kieselguhr. The hydrogenation is preferably carried out in the presence of a solvent such as methyl cyclohexane, toluene, p-methane, etc., utilising pressures ranging from 500 to 10,000 p.s.i. and a temperature of 150° to 300° C.

The petroleum resins are those obtained by the catalytic or thermal polymerization of a mixture of monomers derived from deep cracking petroleum which monomers are chiefly mono- and di-olefins. The catalytic polymerization of such mixtures is generally carried out at low temperatures using Friedel-Crafts catalysts. These resins have softening temperatures (Ball and Ring) ranging from 50° C. to 150° C., a specific gravity 25/25° C. of 0.96–0.980, an iodine value (Wijs)

of 80-150, and a molecular weight of 500 to 2000. The petroleum resins, like the terpene resins, can be hydrogenated to reduce their unsaturation, lighten their colour and otherwise improve their properties.

Another type of hydrocarbon resin useful in the present invention are the polymers of unsaturated coal tar by-products such as the polyindene and coumarone-indene resins. Also useful are the hydrocarbon resins known as styrene resins, as for example, polystyrene, styrene-olefin and styrene-diolefin copolymers, poly (α-methylstyrene, α-methyl-styrene-vinyl toluene copolymer, etc. These resins will generally have a softening point (Ball and Ring) of from about 50° C. to about 150° C.

Any of the usual types of rosins can be used in accordance with this invention, such as wood rosin, gum rosin, tall oil rosin, and the modified rosins, such as partially or substantially completely hydrogenated rosins, dehydrogenated rosins, disproportionated rosins, polymerised rosins, as well as rosin alcohols and heat-treated rosins, etc. Those rosins preferred will have Ring and Ball softening points of at least 60° C.

Suitable rosin esters included are the polyhydric alcohol esters of, the natural rosins. Hydrogenated rosins, polymerized rosins, etc., such as the glycerol and pentaerythritol esters of wood rosin, the ethylene glycol, glycerol and pentaerythritol esters of polymerised rosin, the glycerol and pentaerythritol esters of the hydrogenated rosins, etc.

Particularly suitable resins which can subsequently be hydrogenated are hydrocarbon resins, ketone resins, polyamide resins, colophonium, courmarone resins, terpene resins, chlorinated aliphatic or aromatic hydrocarbon resins. Examples of hydrocarbon resins are polymers of coke oven gas, cracked naphtha, gasoil and terpene oil.

Particularly preferred hydrogenated resins are hydrogenated petroleum resins. These are usually prepared by catalytically hydrogenating a thermally polymerized steam cracked petroleum distillate fraction, especially a fraction having a boiling point of between 20° and 280° C. These fractions usually are of compounds having one or more unsaturated cyclic rings in the molecule, such as cyclodienes, cycloalkenes and indenes. It is also possible to hydrogenate resins produced by the catalytic polymerization of unsaturated hydrocarbons.

Before hydrogenation occurs the polymerized resin is usually dissolved in a saturated hydrocarbon solvent such as heptane. The hydrogenation catalysts used may be nickel, reduced nickel, or molybdenum sulphide. Hydrogenation can take place in a single stage at a temperature of 200° C. to 330° C., preferably from 210° C. to 230° C. at a pressure of 20 to 120 atmospheres, more preferably from 30 to 90 atmospheres for a period of 5 to 7 hours. After filtering off the catalyst, the solvent is removed by distillation and recovered for recycling. An improved hydrogenation process leading to increased yields of high quality hydrogenated hydrocarbon resins is described and claimed in European Patent 0082726 (Application No. 82306853.1).

Although the concentrate may contain from 10 to 90 wt. % of the resin or rosin we prefer they contain from 10 to 80%, more preferably 10 to 70%, most preferably 20 to 60 wt. % since at above about 80 wt. % it can be difficult to get adequate mixing of the resin and the bulk polyolefin during film extrusion. The resin or rosin derivative and the polyolefin must be blended under conditions where both components are molten and under sufficiently high shear conditions to ensure intimate mixing of the high amount of the resin or rosin derivative and the polyolefine. If necessary or convenient, the components may be physically blended prior to melt blending. We have found that in order to obtain satisfactory blends containing more than 10 wt. %, particularly more than 20 wt. % of the resin or rosin derivative the components are conveniently melt blended in a twin screw extruder or a kneader. Alternatively a BANBURY mixer may be used but this is not preferred. Where a twin screw extruder or a kneader is used it is preferred to cool the screw particularly when producing concentrates containing a high resin or rosin content which prevents the resin sticking to the screw.

The ratio of the mixture of the polyolefin and the lower molecular weight resin or rosin mixture to polyolefin in the composition used in film manufacture will depend upon the quantity of resin or rosin desired in the film which in turn depends upon the use to which the film is to be put. For example where heat sealability is required it is preferred that the film contain 70 to 90 weight percent of polyolefin and 10 to 30 weight percent of lower molecular weight resin or rosin. Preferably the relative amounts are respectively 75 to 85 weight percent and 15 to 25 weight percent, for example about 80 weight percent and 20 weight percent. If however the film is to be used for twist wrapping 20 to 30 wt. % resin or rosin is preferred. Amounts of resin or rosin as low as about 5 wt. % can however give valuable improvements in film stiffness.

The film may be obtained by any of the conventional techniques, cast extrusion or flat film or the tubular process which may be followed by orientation to give uniaxially orientated, or preferably biaxially orientated which is achieved by drawing in two mutually perpendicular directions in the plane of the film to impact strength thereto.

Orientation of flat film may be effected by a tenter technique, while orientated tubular film is suitably produced by extruding the polymeric materials in the form of a tube from an annular die, cooling the extruded tube (the cast tube), reheating and inflating the tube by the so-called "bubble" process to introduce transverse orientation, and simultaneously elongating the tube longitudinally to orientate the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

The degree of orientation may be the same or different in the two directions of the plane of the film, for twist wrapping uses it is preferred that the orientation be greater in the one direction, preferably the longitudinal direction.

The films may vary in thickness depending on the intended application, but films of a thickness of from 2 to 150 microns are usually suitable. Films intended for packaging are usually from 10 to 60 microns thick. The thickness of the or each outer layer is usually from 0.05 to 2.5 microns. The films are particularly useful for twist wrapping.

The film may also be coated particularly to improve heat sealability. Examples of coating films for heat sealability, the coating techniques and coating materials used may be found in United Kingdom Patents 1440317, 1452424, 1495776, 2028168, 1569112, 1566077, 1550570, 2098542 and European Patents and Applications 0128077 A, 0126640A, 0002606B, 0015472B, 0012405 B, 0060037 A, 0061238 B, 0008904 B and 0027586 B.

Where improved heat sealability is required, we prefer the film be coated on both surfaces with 1 to 20 weight percent, preferably 1 to 10 weight percent and particularly about 5 weight percent for the or each surface based on the weight of the base layer, of a random copolymer of 80 to 99 weight percent of propylene and 1 to 20 weight percent of ethylene. This copolymer comprising the film layer(s) preferably comprises 90 to 99 weight percent, especially 94 to 98 weight percent, e.g. about 95.5 weight percent of propylene, the remainder being ethylene.

This random copolymer of propylene and ethylene is usually an isotactic propylene-ethylene copolymer with a density of from 0.86 to 0.92 g/cc as measured at 23° C. according to ASTM D1505 and a melt flow index of from 2 to 15 g/10 min as determined according to ASTM D1238 (conditions 230° C. and 2.16 kg). It may be made by well-known polymerization methods using a Ziegler catalyst, for example, $AlCl_{13}$ and $TiCl_4$.

For twist wrapping applications, the base layer of the film containing preferably 20 to 30 wt. % resin may be the only layer of the film. Alternatively, this base layer may be coated on one or both surfaces with other polymers to enhance some desired properties such as the use of polypropylene to improve machineability.

Coated films of this invention, i.e. multilayer films are suitably formed by combining the components (which may if desired include other components such as an antistatic medium, blocking agents and slip aids) of the base layer and surface layers in a conventional manner, preferably by a simultaneous co-extrusion technique.

EXAMPLE 1

In this example a blend of 50 weight percent polypropylene and 50 weight percent of a lower molecular weight resin was made.

The first component was isotactic polyproylene having a density of about 0.90 g/cc and a melt flow index of 2.8 g/10 min as determined according to ASTM D1238 (conditions 230° C. and 2.16 kg).

The lower molecular weight resin had been prepared by catalytically hydrogenating a thermally polymerized steam cracked petroleum distillate fraction having a boiling point between 20 and 280° C. The hydrogenation process was carried out as described in European Patent 0082726 (Application No. 82306853.1). The resulting resin was characterised by a ring and ball softening point of 140° C.

The blend was made by mixing the molten polypropylene and softened resin under high shear conditions in a twin screw extruder, Model ZSK 58, manufactured by Werner & Pfleiderer. The extruder was equipped with two co-rotating inter-meshing screws having a length to diameter ratio of 40 for a diameter of 58 mm. The blend composition was controlled by continuously feeding each component via separate hoppers in the ratio 50/50 into the extruder. The heating elements positioned along the extruder axis were set at 150° C. for the feeding zone 160° C. elsewhere, except for the last element close to the die which was set at 170° C. Melt temperatures recorded in a first mixing zone, in a second mixing zone and at the die were 170° C., 194° C. and 178° C. Speed of the screws was 250 rpm while a pressure at the die of 14 bar was recorded. The extruded strand was pelletized by cutting under water. The product was characterised by a melt flow of 30 g/10 min, as determined according t ASTM D1238 (conditions 230° C. and 2.16 KG).

This concentrate was used to produce biaxially orientated polypropylene film.

In a first experiment (Example 1-a), a mix of 40 wt % of the concentrate and 60 wt % of an isotactic polypropylene with density of about 0.90 g/cc and melt flow index of 2.8 g/10 min was extruded into a film. The film was biaxially orientated by drawing in two materially perpendicular directions in the plane of the film in a tenter frame. To import a draw ratio of 500% in machine direction and of 900% in the transverse direction. Film thickness, after orientation was about 22 microns.

In a second experiment (Example 1-b), biaxially orientated film was produced in the same way as in Example 1-a except that a mix of 60 wt % of the concentrate and 40 wt % of the polypropylene was used. A third film (example 1-c) was produced for comparison purposes from 100% of the polypropylene used in Example 1-a only. Results for these three films are shown in Table 1.

TABLE 1

| Example | Secant modulus-1%(*) N/mm 2 | Twist retention(**) |
|---|---|---|
| 1-a | 2500 | 0.65 |
| 1-b | 2900 | 0.75 |
| 1-c | 1900 | 0.25 |

(*)measured in machine direction according to ASTM D882
(**)visual assessment of the degree of twist retention by laboratory simulation of candy wrapping operations. Under conditions which have been kept constant through the three examples, candies where manually wrapped and the extremes of the film twisted over an angle of 360 degrees. The angle of untwisting was then observed to assess the degree of twist retention.

EXAMPLE 2

In this example, coextruded films were produced consisting of a core coated on both surfaces with a film of a random copolymer of about 95.5 wt % propylene and 4.5 wt % ethylene of density of 0.90 g/cc and melt flow index of 6.5 g/10 min as determined according to ASTM D1238 (conditions 230° C. and 2.16 kg). The coextruded films were orientated in the same way as in example 1, yielding films with core thickness of about 20 micron and a total thickness of about 22 micron. In the first experiment (example 2-a), the core was produced from a mix of 60 wt % of the concentrate of Example 1 and 40 wt % of polypropylene. In a second experiment performed for comparison purposes, the core was 100% polypropylene. Results for these two coextruded films are shown in table 2.

TABLE 2

| Example | Secant modules-1%(*) N/mm 2 | Seal strength at 110° C. (**)Kg/15 mm |
|---|---|---|
| 2-a | 2750 | 0.20 |
| 2-b | 1740 | 0.00 |

(*)measured in machine direction according to ASTM D882
(**)Seals made with Packforsk instrument (model 52-B) from Design a Text consult AB (Bomma-Sweden). After the seal has cooled to ambient temperature, the unsealed ends where attached to the jaws of a tensile testing machine. The force required to break the seal at a rate of 580 mm/minute was recorded and expressed as the seal strength in Kg/15 mm.

EXAMPLE 3

In this example, blends of polypropylene and the lower molecular weight resin blend in Example 1 were made in a kneader. In a series of experiments at five different blends were produced containing the polypropylene used in Example 1 and respectively 50, 60, 70, 80 and 90 wt % of the lower molecular weight resin used in Example 1. Melt temperatures in the range 180°-200° C. were recorded while the screw of the kneader was cooled to a temperature in the range of 120°-140° C. Products were pelletized as in Example 1. The melt index of the different concentrates, as determined at 190° C. under a load of 2.16 kg according to ASTM D1238, is shown in table 3.

TABLE 3

| Example | wt % resin in blend | melt index of blend g/10 min |
|---|---|---|
| 3-a | 50 | 10 |
| 3-b | 60 | 30 |
| 3-c | 70 | 50 |
| 3-d | 80 | 120 |
| 3-e | 90 | 1250 |

In a subsequent series of experiments, each of these concentrates was physically mixed with the polypropylene used in Example 1 in the appropriate ratio to obtain 30 wt % of resin in the mix. These mixtures were used to produce film in a normal film extruder with no problem using the blends derived from the concentrates containing 50, 60, and 70 wt % of resin. With the contentrate containing 80 wt % of resin, the extrusion was slightly irregular while with the concentrate containing 90 wt % of resin stable operating conditions could not be obtained. For comparison purposes, attempts were made to extrude a physical mix of 70 wt % polypropylene and 30 wt % of the resin but this failed completely, due to the very large difference in softening/melting temperatures of the polypropylene and the resin and the difference in their rheological properties.

We claim:

1. A process for the production of polyolefin films comprising:
    blending under high shear conditions a polyolefin selected from the group consisting of polypropylene and copolymers of propylene with up to 20 wt. % of ethylene or a $C_4$ to $C_8$ mono alpha olefin, and at least one modifier selected from the group consisting of a resin and a resin to form a concentrate mixture comprising 10 to 90 wt. % polyolefin and 10 to 90 wt. % modifier;
    mixing said concentrate with additional polyolefin selected from the group consisting of polypropylene with copolymers of propylene with up to 20 wt. % of ethylene or a $C_4$ to $C_8$ mono alpha olefin, to form a blend comprising 70 to 95 wt. % polyolefin and 5 to 30 wt. % modifier; and
    extruding the blend to form a film.

2. A process according to claim 1 wherein said concentrate mixture comprises 20 to 60 wt. % of the modifier.

3. A process according to claim 1 wherein said polyolefin is polypropylene.

4. A process according to claim 1 wherein the polyolefin is isoatactic polypropylene having a density of 0.65 to 0.92 g/cc and a melt flow index of 1 to 15 g/10 min.

5. A process according to claim 1 wherein the modifier is hydrogenated.

6. A process according to claim 1 wherein the resin has a number average molecular weight below that of the polyolefin.

7. A process according to claim 1 wherein the resin has a softening point of 60° to 180° C.

8. A process according to claim 1 wherein the polyolefin and modifier are physically blended prior to blending under high shear conditions.

9. A process according to claim 1 wherein the polyolefin and modifier are blended in a twin screw extruder.

10. A process according to claim 1 where the film contains containing 70 to 90 wt. % polyolefin and 10 to 30 wt. % modifier.

11. A process according to claim 1 wherein the film is further uniaxially oriented.

12. A process according to claim 1 wherein the film is further biaxially oriented.

13. A process according to claim 1 wherein the film is further coated with a layer being a copolymer comprised of 80 to 99 wt. % propylene and 1 to 20 wt. % ethylene.

14. A process for the production of polyolefin films comprising:
    blending under high shear conditions a polyolefin selected from the group consisting of polypropylene and copolymers of propylene with up to 20 wt. % of ethylene or a $C_4$ to $C_8$ mono alpha olefin, and at least one modifier selected from the group consisting of resin and rosin to form a concentrate mixture comprising 60 to 90 wt % modifier and 10 to 40 wt % polyolefin;
    mixing said concentrate mixture with additional polyolefin selected from the group consisting of polypropylene and copolymers of propylene with up to 20 wt. % of ethylene or a $C_4$ to $C_8$ mono alpha olefin, to form a blend comprising 70 to 95 wt % polyolefin and 5 to 30 wt % modifier; and
    extruding the blend to form a film.

* * * * *

UNITED STATES PATENT AND TRADEMARK OFFICE
CERTIFICATE OF CORRECTION

PATENT NO. : 5,213,744
DATED : May 25, 1993
INVENTOR(S) : Bernard L.L. Bossaert

It is certified that error appears in the above-indentified patent and that said Letters Patent is hereby corrected as shown below:

Column 7, line 47, claim 1, after "of a resin and a", delete "resin" and substitute therefor --rosin--.

Signed and Sealed this

Thirteenth Day of June, 1995

Attest:

BRUCE LEHMAN

*Attesting Officer*  *Commissioner of Patents and Trademarks*